United States Patent [19]
Murata et al.

[11] Patent Number: 6,017,213
[45] Date of Patent: Jan. 25, 2000

[54] METHOD AND APPARATUS FOR COOLING EXHAUST GAS IN A KILN BY-PASS

[75] Inventors: Mitsuaki Murata, Mie; Hiuma Kaneko, Tokyo; Naoki Ueno, Saitama, all of Japan

[73] Assignee: Taiheivo Cement Corporation, Tokyo, Japan

[21] Appl. No.: 09/254,891

[22] PCT Filed: Jun. 25, 1998

[86] PCT No.: PCT/JP98/02843

§ 371 Date: Mar. 16, 1999

§ 102(e) Date: Mar. 16, 1999

[87] PCT Pub. No.: WO99/03794

PCT Pub. Date: Jan. 28, 1999

[30] Foreign Application Priority Data

Jul. 17, 1997 [JP] Japan ................................. 9-192825

[51] Int. Cl.[7] ............................................ F27B 7/38
[52] U.S. Cl. ............................ 432/116; 432/77; 432/117
[58] Field of Search ................. 432/77, 82, 113, 432/116, 117, 173

[56] References Cited

U.S. PATENT DOCUMENTS

| 2,740,620 | 4/1956 | Petersen | 432/117 |
| 5,525,057 | 6/1996 | Monoe | 432/77 |
| 5,906,482 | 5/1999 | Tedman | 432/77 |

FOREIGN PATENT DOCUMENTS 9175847  7/1997  Japan .

Primary Examiner—Teresa Walberg
Assistant Examiner—Gregory A. Wilson
Attorney, Agent, or Firm—Price, Heneveld, Cooper, DeWitt & Litton

[57] ABSTRACT

A probe having a double-tubed structure is provided to communicate with a kiln exhaust gas flowing path. A part of kiln exhaust gas is extracted through an inner tube of the probe, while cooling gas is supplied to a fluid flowing path formed between the inner tube and an outer tube of the probe. The cooling gas is guided to flow into an inner area of a front end portion of the inner tube so as to form a mixing and quick cooling area at a front end portion of the probe, thereby rapidly cooling the extracted gas.

12 Claims, 10 Drawing Sheets

METHOD AND APPARATUS FOR COOLING EXHAUST GAS IN A KILN BY-PASS

TECHNICAL FIELD

The present invention relates to a method and an apparatus for cooling an exhaust gas in a kiln by-pass, particularly in an alkali by-pass or chlorine by-pass system.

BACKGROUND ART

Usually, when a mass of cement clinker is calcined in a SP (suspension preheater) kiln or a NSP (new suspension preheater) kiln, volatile components such as chlorine, alkali and sulfur which have been brought by cement raw materials and fuel, are circulated within a preheater system so that they are continuously concentrated.

However, it is well known that this kind of circulation will reach equilibrium in several hours, a state where the amount of volatile components being brought into the preheater system from the cement raw materials and fuel is equal to the amount of volatile components being taken out of the system by the cement clinker.

Therefore, if the amount of volatile components being brought into the system from the cement raw materials and fuel is large, the amount of volatile components contained in the cement clinker also becomes large. This influences adversely on the quality of the cement product.

Further, if the amount of volatile components in the system increases, compounds having low melting points will be formed, causing possibly frequent clogging of the preheater system and working adversely against a stable operation of the kiln.

Recently, especially as the utilization of industrial wastes has been promoted, it is increasingly needed to utilize raw materials having high chlorine content, and efficient removal of volatile components has been expected.

So, in order to reduce the amount of volatile components within a kiln preheater system, the so-called by-pass installation has been provided to the system (e.g. Laid-open Japanese Patent Publication H2-116649).

The by-pass installation includes a rising duct connected on the rotary kiln inlet for discharging kiln exhaust gas, a probe whose front end abuts on the inside of, or preferably is protrudingly provided inside of, the rising duct for extracting a part of the kiln exhaust gas, and a system connected at the rear end of the probe for extracting and discharging the kiln exhaust gas.

The above probe is formed into a double-tubed structure including an inner tube connected to the gas extracting and discharging system, and an outer tube for introducing the atmosphere into the vicinity of the front end of the inner tube protruding into the rising duct. In the by-pass installation, the atmosphere is introduced into the rising duct through an air flow path formed between the outer tube and the inner tube, while at the same time a part of the kiln exhaust gas is extracted out of the rising duct together with the introduced air.

Further, it is known that, if rapidly cooled in the probe to a temperature of 600–700° C. or lower, volatile components such as chlorine contained in the kiln exhaust gas will be concentrated to form fine powder entrained in by-pass dust which is generated by the kiln by-pass process.

It is therefore suggested that a by-pass dust separating means be provided downstream of the probe for separating coarse powder dust having low volatile component concentration and fine powder dust having high volatile component concentration, and feeding the former back to the kiln.

On the other hand, there has been developed a kiln by-pass technique which is able to greatly reduce the amount of by-pass dust by discharging only fine powder dust from the kiln preheater system.

With the technique, it is indispensable to provide a means for concentrating volatile components into fine powder dust, that is, a means for rapidly cooling the kiln exhaust gas in the probe.

In a conventional probe having a double-tubed structure, cooling air is caused to flow through an air path formed between an outer tube and an inner tube so that it flows into a rising duct connected on the kiln inlet, to cool the kiln exhaust gas to be extracted.

However, since there is a considerable degree of the so-called blow-by of the cooling air, it is not available to mix the cooling air with the kiln exhaust gas quite efficiently at the front end portion of the probe. As a result, it is difficult to effect an instant quick-cooling of the kiln exhaust gas at the front end portion of the probe.

So, when a conventional probe is used, the amount of the cooling air will be increased so as to enable quick cooling. However, increase of the cooling air leads to increase of the cooling air flowing into a preheater system, meaning air increase in the preheater system, and heat loss and electric power loss will result.

It is an object of the present invention to provide an improved method and apparatus capable of effectively quick-cooling a by-pass kiln exhaust gas to be extracted without causing heat loss, electric power loss, etc.

DISCLOSURE OF THE INVENTION

According to one aspect of the present invention, there is provided a method of cooling an exhaust gas in a kiln by-pass, wherein a probe having a double-tubed structure is provided to communicate with a kiln exhaust gas flowing path, a part of the kiln exhaust gas is extracted through an inner tube of the probe, and a cooling gas is supplied to a fluid flowing path formed between the inner tube and an outer tube of the probe. The cooling gas is guided to flow into an inner area of a front end portion of the inner tube so as to form a mixing and quick-cooling area at a front end portion of the probe.

According to another aspect of the present invention, there is provided an apparatus for cooling an exhaust gas in a kiln by-pass, wherein the apparatus comprises a probe having a double-tubed structure and communicating with a kiln exhaust gas flowing path, and the probe includes an inner tube for extracting a part of the kiln exhaust gas, an outer tube having a portion protruding from a front end portion of the inner tube, and a fluid flowing path formed between the outer tube and the inner tube for supplying cooling gas therethrough. A guide is provided to guide the cooling gas to flow into an inner area of the front end portion of the inner tube so as to form a mixing and quick cooling area at the front end of the probe.

DETAILED DESCRIPTION OF PREFERRED EMBODIMENTS

Figure 1:
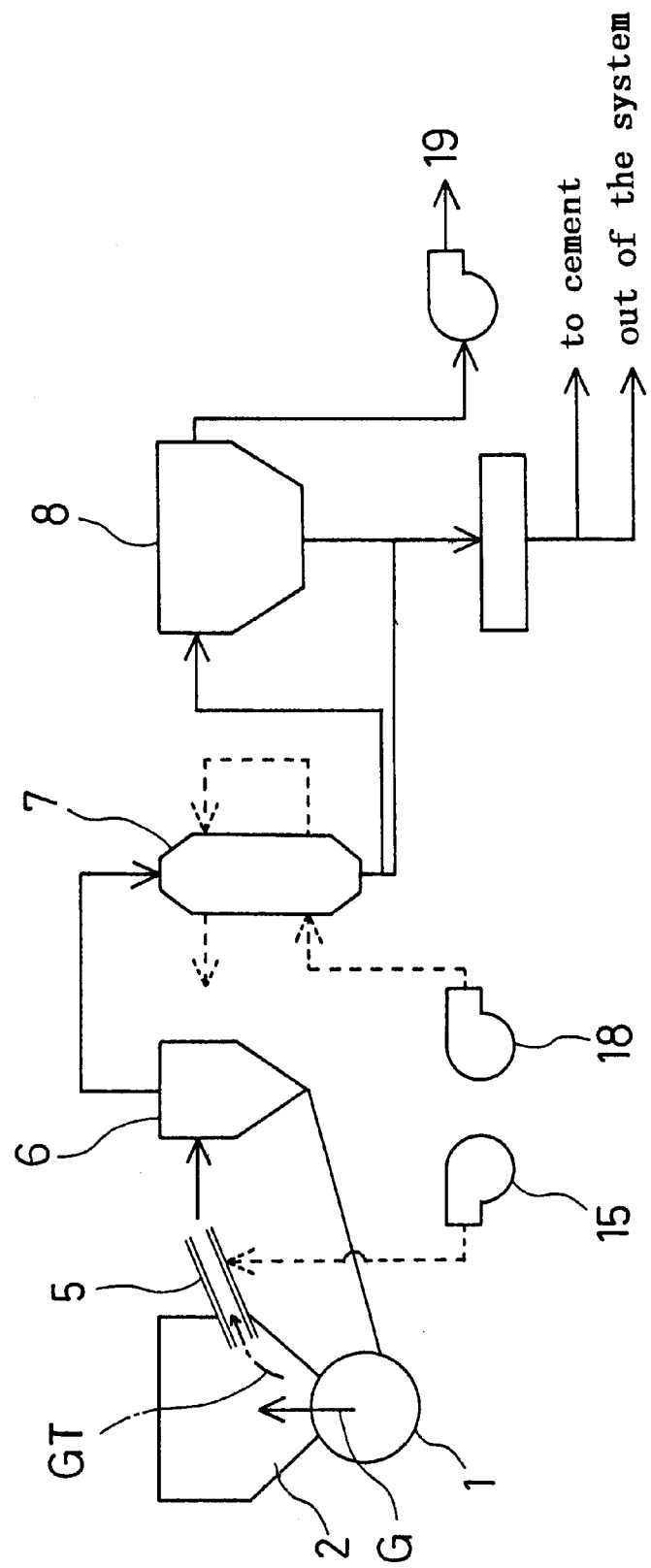
FIG. 1 is a view schematically showing a cement calcination system according to a first embodiment of the present invention.
Figure 2:
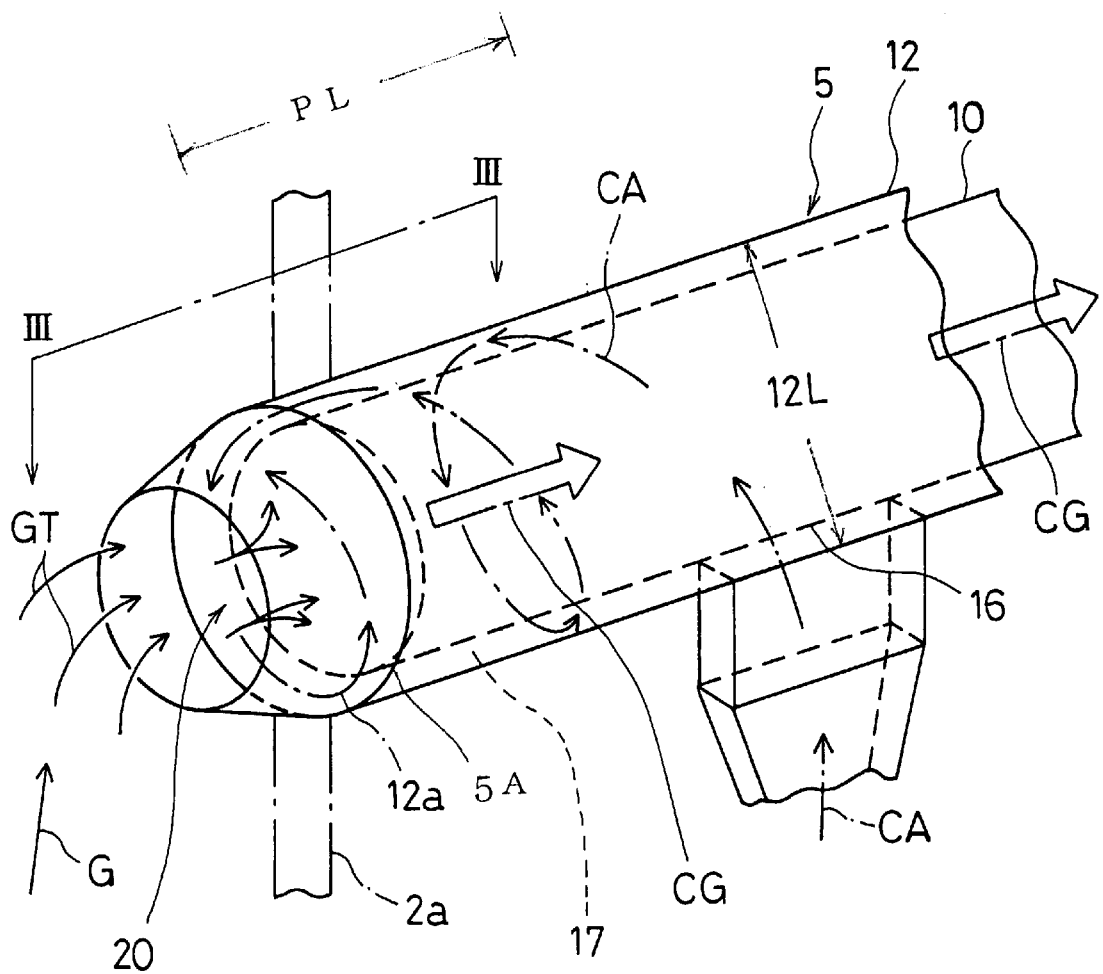
FIG. 2 is a perspective view showing an important part of FIG. 1.
Figure 3:
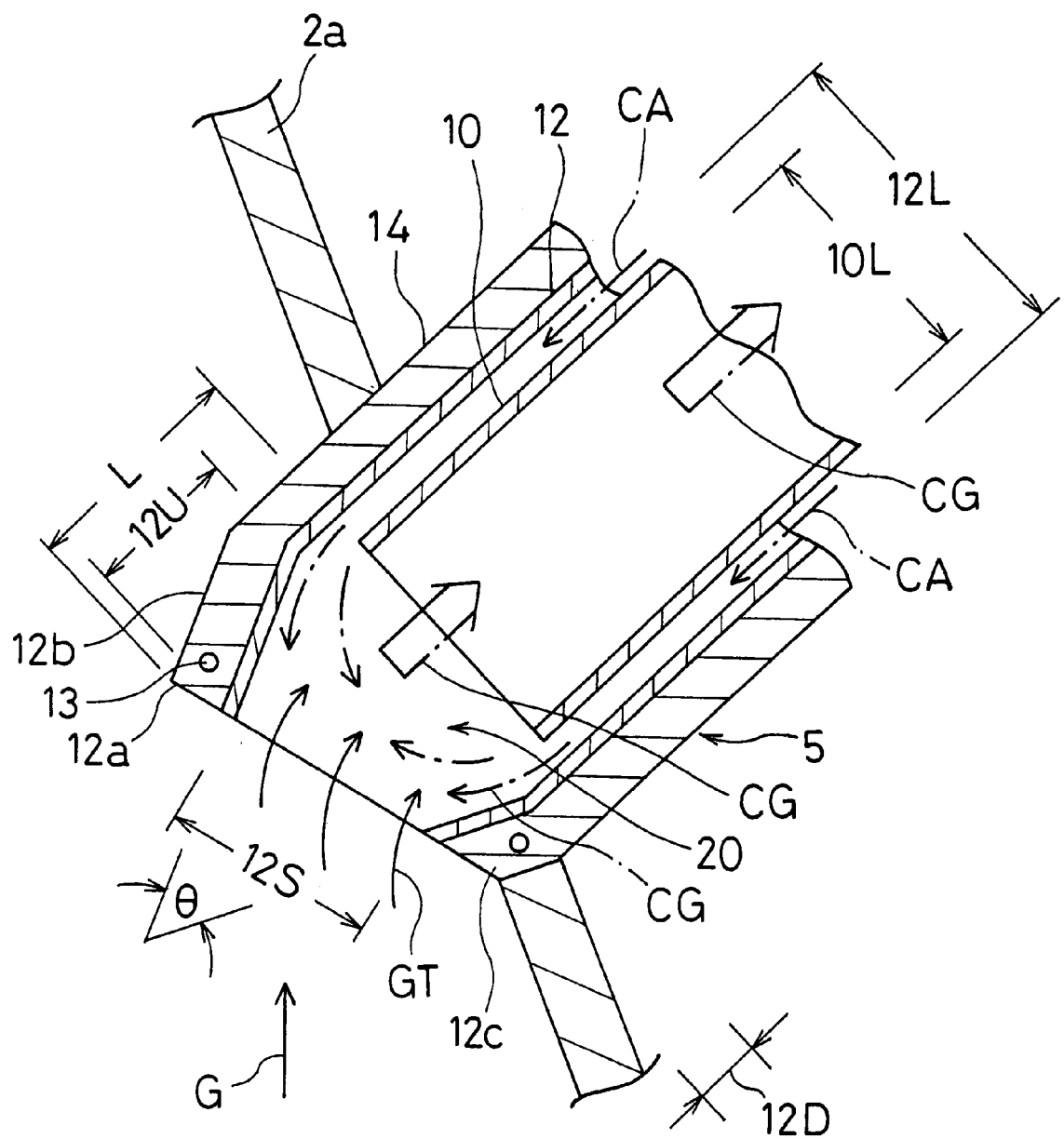
FIG. 3 is an enlarged cross-sectional view taken along a line III—III of FIG. 2.

A first embodiment of the present invention will be described with reference to FIGS. 1–3.

A rotary kiln 1 of a cement calcination system is connected to a rising duct 2 which forms a part of a flow path for discharging kiln exhaust gas. A probe 5 is attached to the rising duct 2 and is connected to a dust collector 8 by way of a cyclone 6 and a heat exchanger 7.

The probe 5 includes an inner tube 10 and an outer tube 12 which are mutually movably engaged together, and is protrusively provided to an inclined wall 2a of the rising duct 2. Alternatively, it may be protrusively provided to a vertical wall unrestricted to an inclined wall.

A front end portion 12a of the outer tube 12 protrudes from a front end portion 10a of the inner tube 10. A protruding amount L may be appropriately determined according to need.

The front end portion 12a of a straight section of the outer tube 12 converges to form a conical trapezoidal shape. A converging angle θ may be appropriately determined according to need.

An upper edge 12b of the front end portion 12a of the outer tube 12 is formed longer than a lower edge 12c. The difference in length between the two edges may be appropriately determined according to need.

The inner diameter 12S of the front end portion 12a may be selectively determined within a range (Inner Diameter of the Front End of the Outer Tube 12S)/(Inner Diameter of the Outer Tube 12L)=0.4–0.6.

The outer surface of the outer tube 12 is covered by a refractory layer 14, and a ring-like water cooling pipe 13 is embedded therein in a manner whose diameter and method for provision may be appropriately determined according to need.

On the outer surface of the outer tube 12 there is provided a cooling air inlet 16 which is in communication with a probe cooling fan 15. The cooling air inlet 16 is in communication with a fluid flowing path 17 which is formed between the outer tube 12 and the inner tube 10. Reference numeral 18 is a cooling fan for a cooler, and reference numeral 19 is an exhaust fan.

An operation of the embodiment is described in the following:

GT which is a part of a 1100° C. kiln exhaust gas G generated in the rotary kiln 1 is extracted therefrom through the probe 5. An amount of extraction may be, for example, 10% or more of a gas passing through the kiln inlet in case of an alkali by-pass, compared to 5% or less in case of a chlorine by-pass, and about 2% in a general case.

Therefore, cooling air CA is supplied through the cooling air inlet 16 to the fluid flowing path 17 of the probe 5. The cooling air flows down the fluid flowing path 17 forming into a circling flow, and is guided into the inner tube 10 through the converging front end portion 12a of the outer tube 12, to form a mixing and quick-cooling area 20 in the vicinity of the front end portion 10a of the inner tube 10.

In the mixing and quick-cooling area 20, the extracted exhaust gas GT mixes with the cooling air CA and is instantaneously cooled to form a cooled gas CG.

Namely, in the mixing and quick-cooling area 20 formed at a front end portion 5a of the probe 5, the extracted exhaust gas GT is rapidly cooled to 600–700° C. which is the melting point range of chlorides.

In the above operation, the cooling air CA has a temperature of the atmosphere, for example, 18° C. The speed at which the cooling air CA flows out of the probe in a longitudinal direction is adjusted to ⅓–⅔ of a speed of the kiln exhaust gas CG flowing in the inner tube 10.

Since the cooling air CA flows in such a circling manner and its flowing direction and speed are all restricted, there is not the so-called blow-by there. Accordingly, the extracted gas GT and the cooling air CA can be mixed together with a greatly improved efficiency, and the extracted gas GT can be cooled instantaneously to a desired temperature, while non-extracted exhaust gas G can be prevented from being cooled by the cooling air CA.

Here, in order to form the mixing and quick-cooling area 20 at the front end portion 5a of the probe and to effect an instantaneous mixing of the extracted gas GT with the cooling air CA, it is necessary to ensure a circling force for the cooling air CA so that the cooling air CA may be uniformly discharged from the entire circumference of the front end portion of the probe.

In this regard, the discharge speed of the cooling air CA and the length PL of the probe 5 are important factors. The discharge speed has already been explained showing example figures. So, the length of the probe 5 will be described in the following.

Here, the length PL of the probe 5 means the distance from the cooling air inlet 16 on the outer tube 12 to the front end SA of the straight duct portion of the probe 5.

By way of example, the probe 5 is formed to have a length PL of 600–2000 mm, and its outer tube 12 to have an inner diameter 12L of 400–1000 mm. The ratio of the two lengths, PL/12L, is made to be 2.0 or less, so that a circling force for the cooling air can be secured.

PL/12L value is variable depending on the discharging speed and the inner diameter 12L of the outer tube 12. Our research shows that if an appropriate upper limit value of the ratio is shown as X, then an optimum range of X is 1.5 to 2.0.

A computer simulation performed to calculate mixing condition (gas concentration) of the extracted gas GT and the cooling air CA under various PL/12L values shows that compared to the case when PL/12L is 2.3, when PL/12L is 2.3, the highest gas temperature will be higher and a mixing efficiency will be deteriorated.

If PL/12L value is >2.0 exceeding an appropriate upper limit value X due to layout of the system, a circling flow can be secured by providing a circulation blade inside the outer duct 12 as an auxiliary circulation means.

There is not an appropriate lower limit value for PL/12L in view of securing a circling force of the cooling air CA. However, such lower limit value will be about 1.0 viewing from the layout of the system.

The extracted gas GT cooled in the probe 5 becomes a cooled kiln exhaust gas CG and moves into the cyclone 6 in which it is separated. There, the separating point will be 5–7 μm by way of example and powder exceeding 5–7 μm in size will be sent back to the rotary kiln 1.

The cooled kiln exhaust gas CG containing fine powder of and below 5–7 μm in size is caused to pass through the heat exchanger 7 for heat exchange, and then move into the dust collector 8 to collect dust, and is discharged into the atmosphere.

The dust having a high chlorine content collected in the heat exchanger 7 and the dust collector 8 is discharged out of the cement kiln system. The discharged chlorine-containing dust may be either added to the cement or treated out of the cement kiln system.

Figure 4:
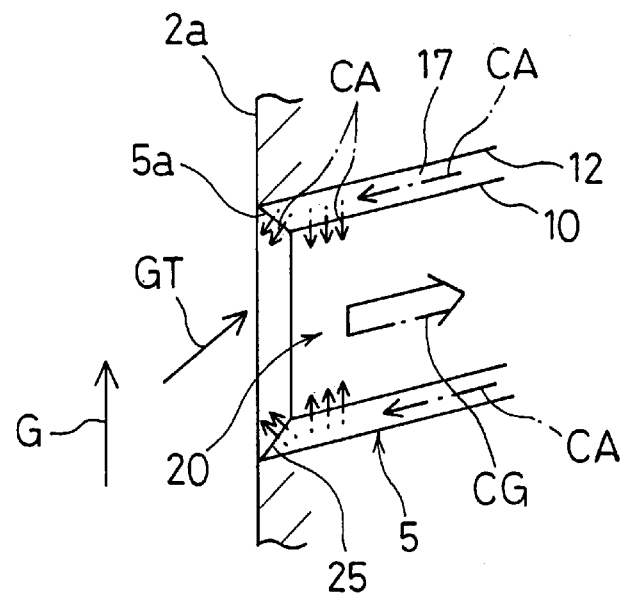
FIG. 4 is a cross-sectional view indicating a second embodiment of the present invention.
Figure 5:
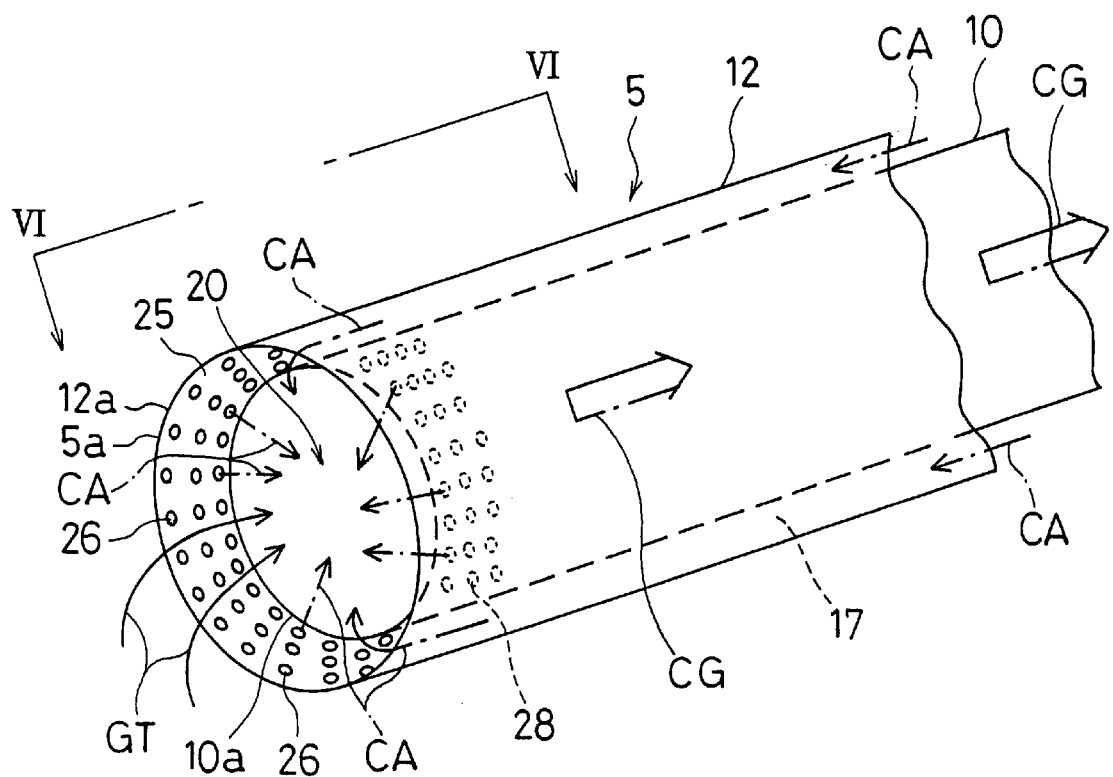
FIG. 5 is an enlarged perspective view showing an important part relative to FIG. 4.
Figure 6:
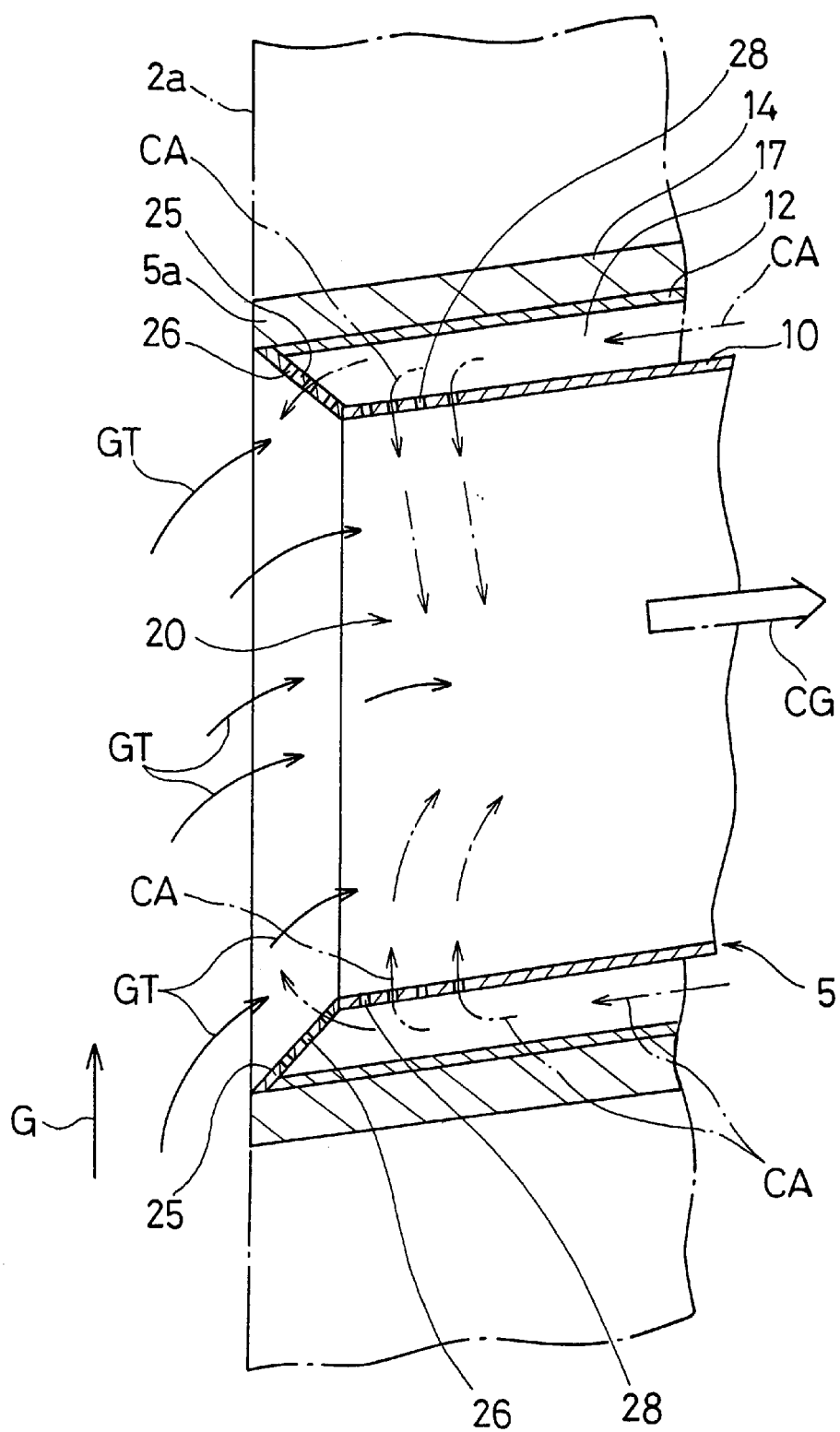
FIG. 6 is an enlarged cross-sectional view taken along a line VI—VI of FIG. 5.

A second embodiment of the present invention will be described with reference to FIGS. 4–6.

The second embodiment will differ from the first embodiment (shown in FIGS. 1–3) in the following points.

(1) A conical trapezoidal oblique plate 25 is provided in a position between the front end section 12a of the outer tube 12 and the front end section 10a of the inner tube 10 so as to block the fluid flow path 17.

(2) As a means to cool the front end section 5a of the probe 5, instead of using a ring-like water-cooling pipe 3, a plurality of air holes 26 are formed on the oblique plate 25, for injecting the cooling air CA through the air holes 26 to cool the front end portion 5a of the probe 5, thereby preventing the probe 5 from heat damage. The number, diameter, position, etc. of the air holes 26 may be appropriately decided according to need. By way of example, the diameter may be formed to be 8–10 mm.

(3) A plurality of air holes 28 for cooling air to cool kiln exhaust gas are bored on the front end portion 10a of the inner tube 10, so that the cooling air CA may be introduced into the inner tube 10 through these holes 28, thereby forming a mixing and quick-cooling area 20 in the front end portion of the probe. The diameter, number, locating position, etc. of the holes 28 may be appropriately determined according to need. By way of example, the diameter may be formed to be 8–10 mm.

Figure 7:
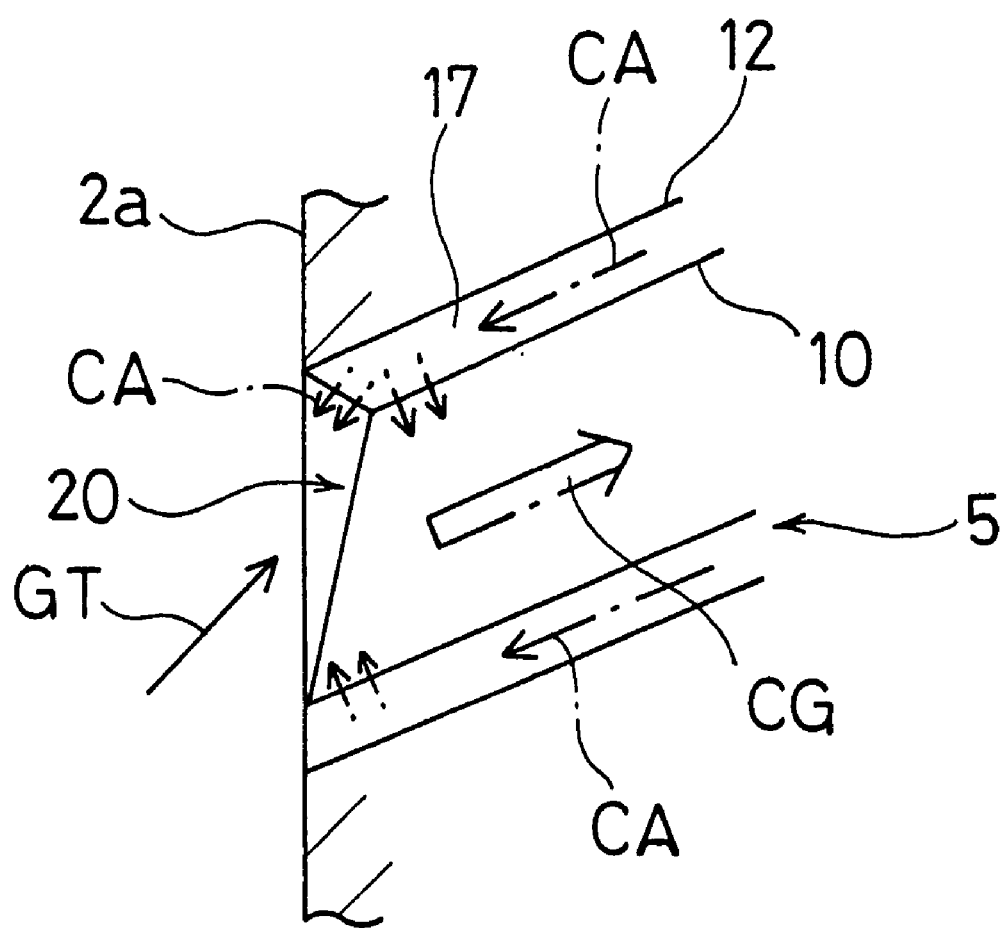
FIG. 7 is a cross-sectional view indicating a third embodiment of the present invention.
Figure 8:
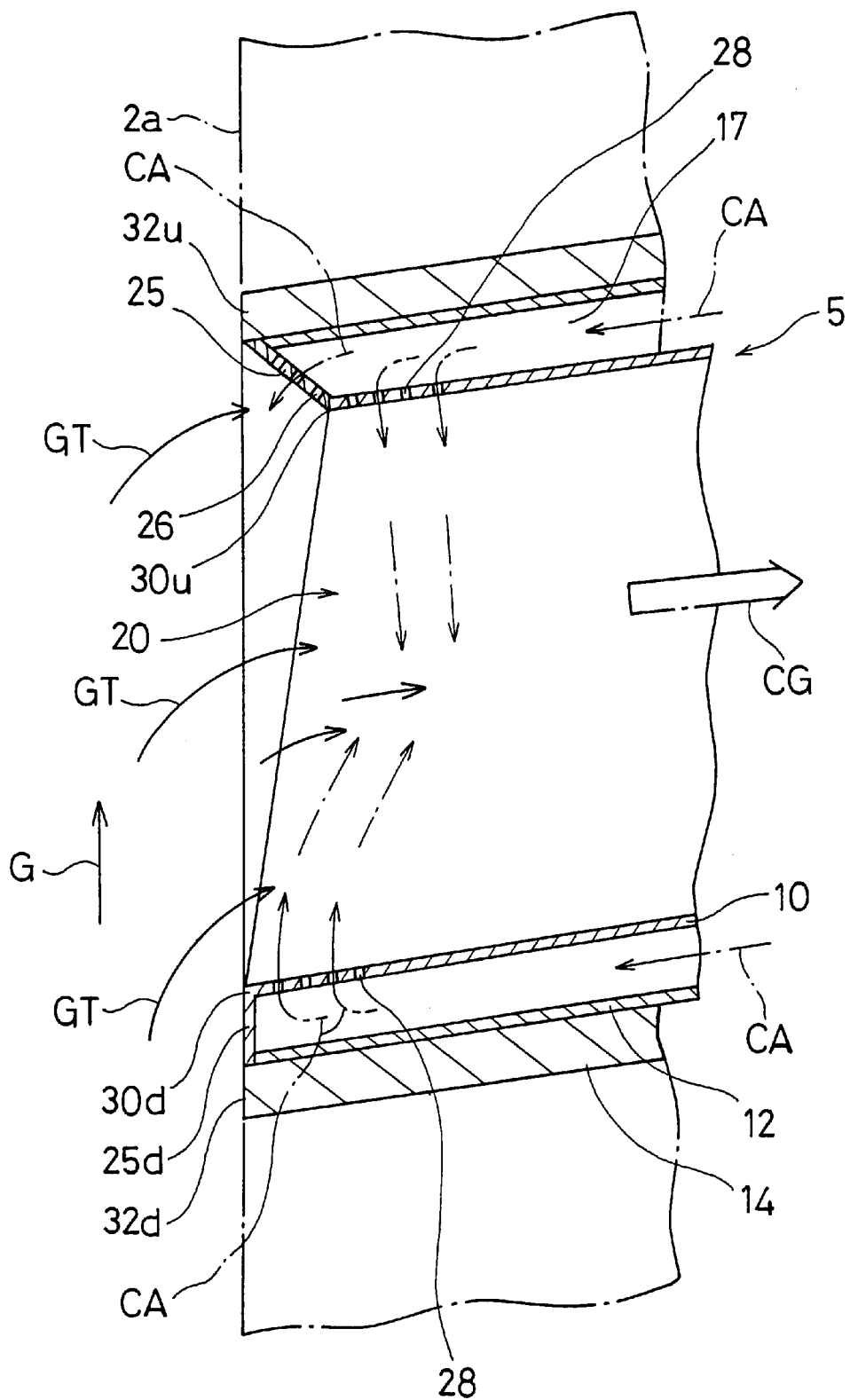
FIG. 8 is an enlarged view of FIG. 7.

A third embodiment of the present invention will be described with reference to FIGS. 7 and 8.

The third embodiment differs from the second embodiment (shown in FIGS. 4–6), in that an upper front end portion 32u of the outer tube 12 protrudes from an upper front end portion 30u of the inner tube 10, while a lower front end portion 32d thereof and a lower front end portion 30d of the inner tube 10 are positioned vertically equally, such that a portion 25d of the oblique plate located between the two front end portions 32d and 30d, is vertical without air holes for protecting the front end of the probe.

Figure 9:
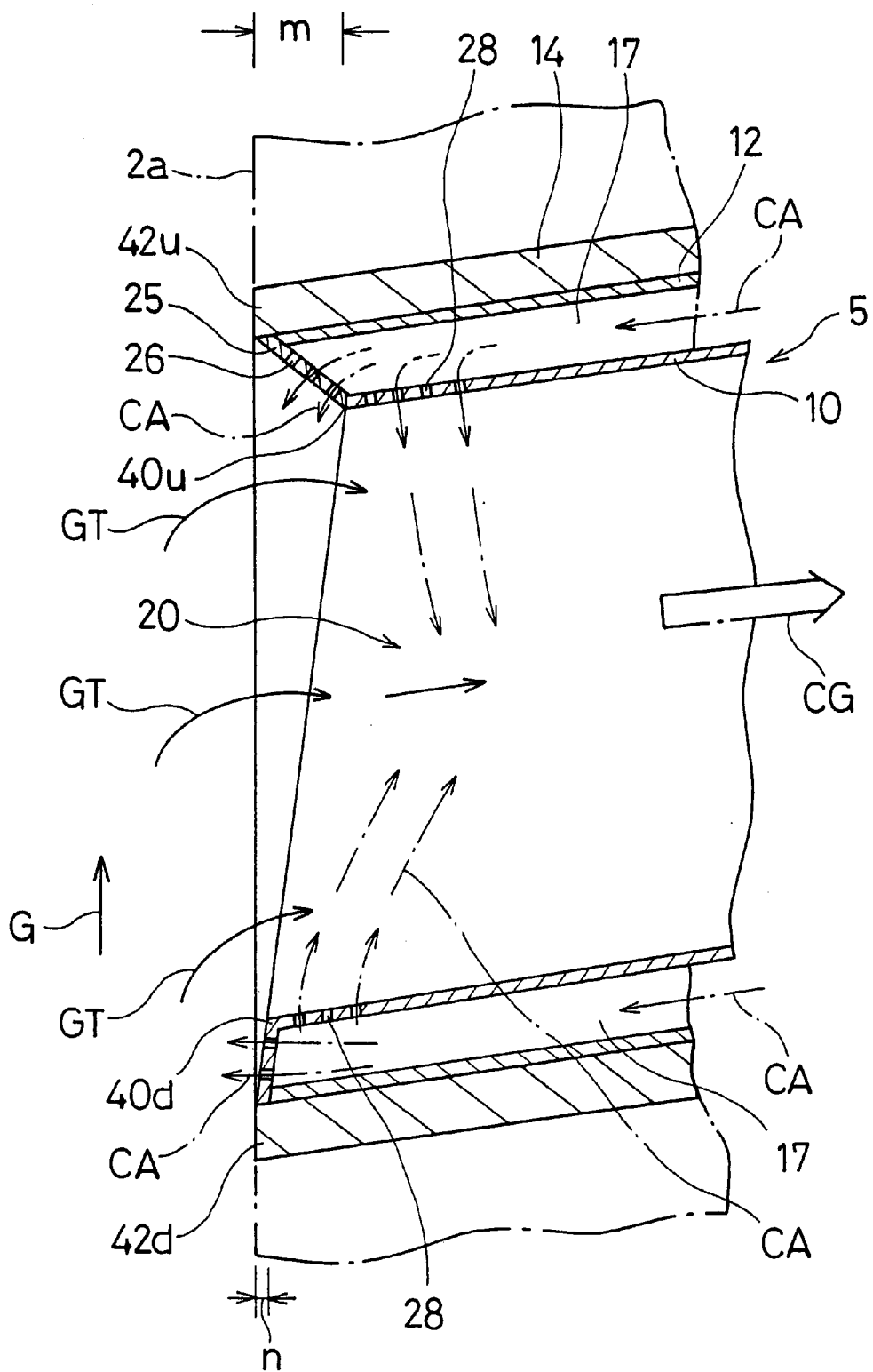
FIG. 9 is an enlarged cross-sectional view indicating a fourth embodiment of the present invention.

A fourth embodiment of the present invention will be described with reference to FIG. 9.

This embodiment differs from the second embodiment (shown in FIGS. 4–6) in that an upper front end portion 40u of the inner tube 10 is shorter than its lower front end portion 40d, thereby causing a protruding amount m of an upper front end portion 42u of the outer tube 12 from the inner tube 10 to be larger than a protruding amount n of its lower front end portion 42d.

Figure 10:
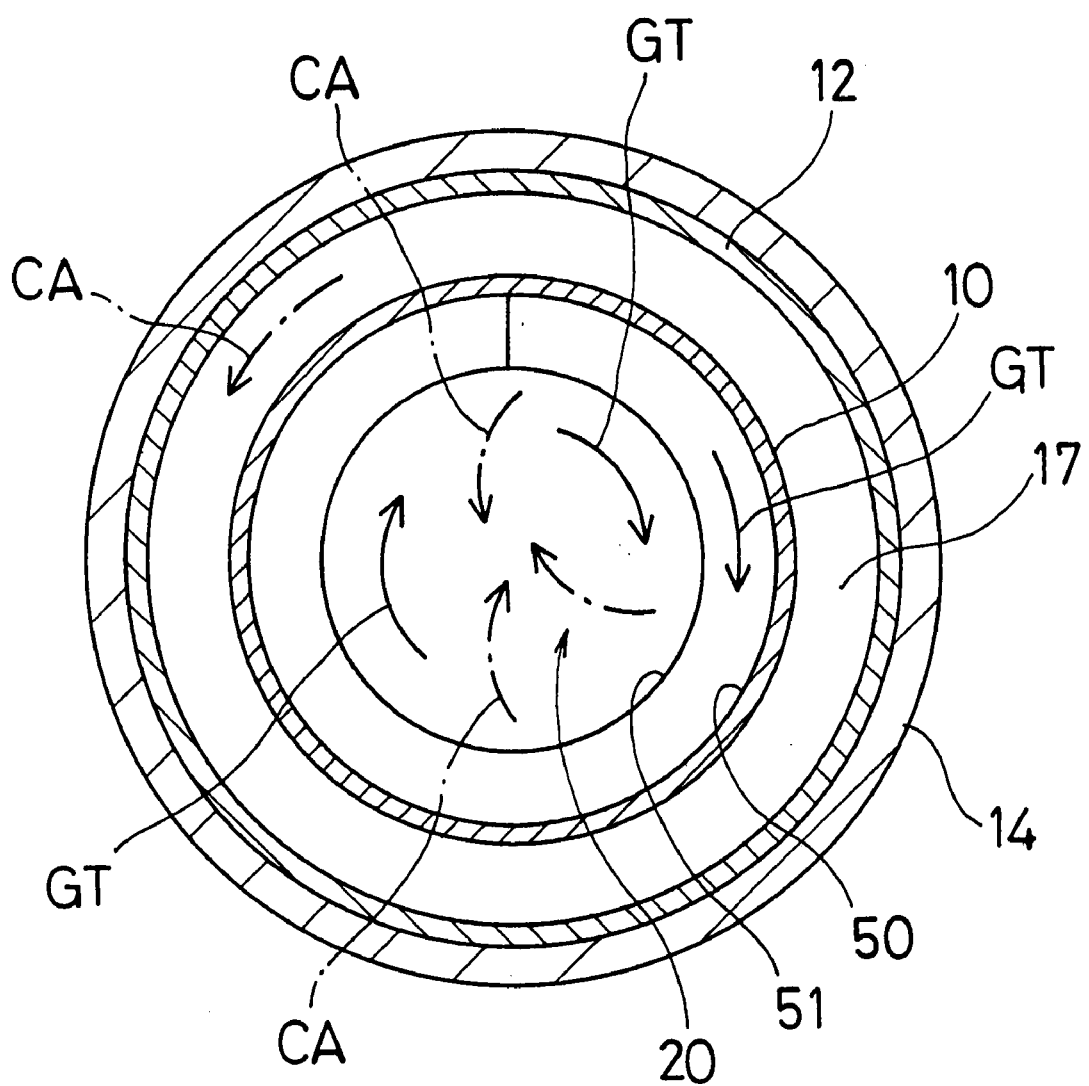
FIG. 10 is an enlarged cross-sectional view indicating a fifth embodiment of the present invention.

A fifth embodiment of the present invention will be described with reference to FIG. 10.

In this embodiment, a spiral guide blade 51 is provided on an internal surface 50 of the inner tube 10, to further promote mixing of the cooling air CA with the extracted gas GT efficiently in the mixing and quick-cooling area 20.

Figure 11:
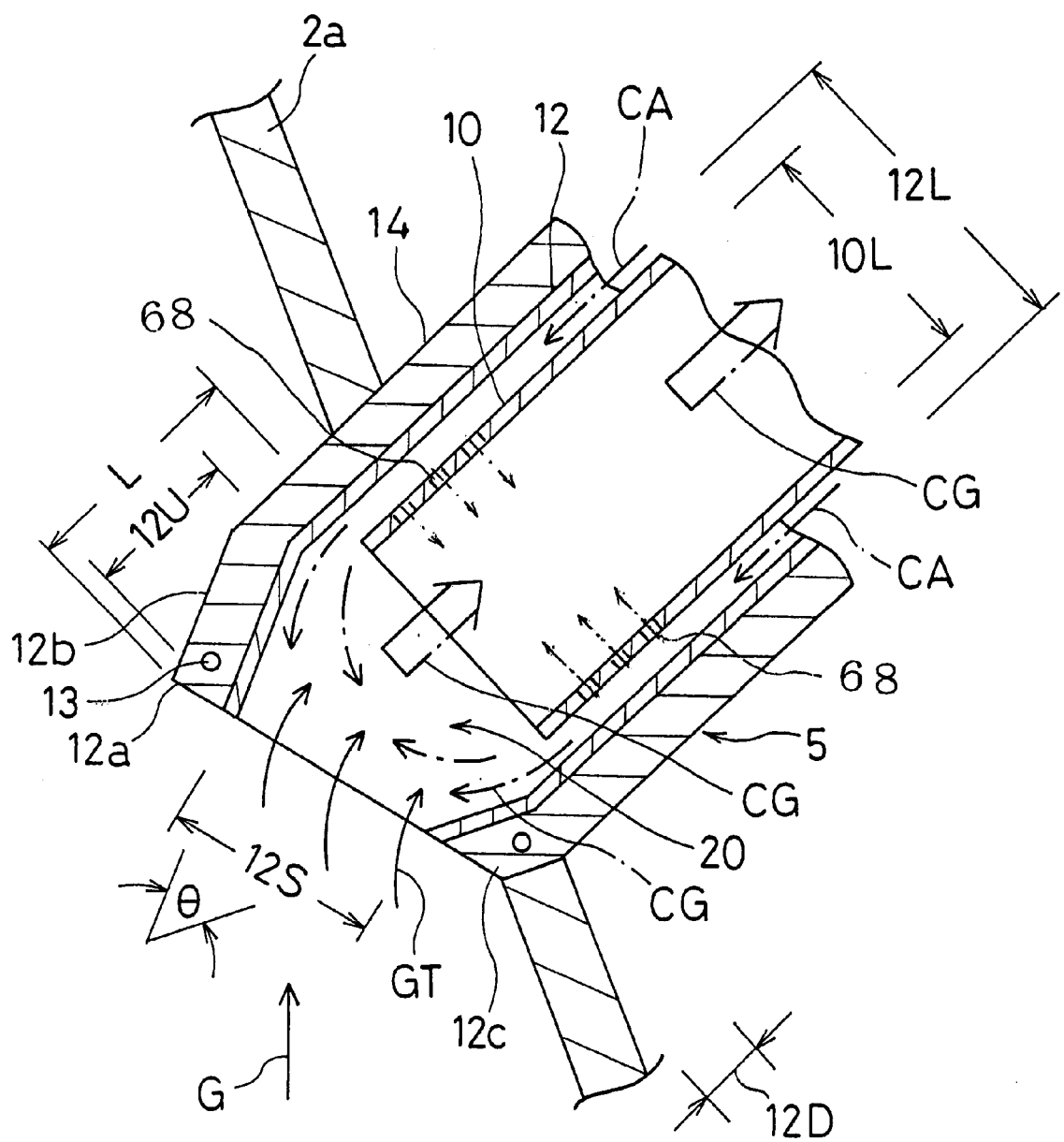
FIG. 11 is an enlarged cross-sectional view indicating a sixth embodiment of the present invention.

A sixth embodiment of the present invention will be described with reference to FIG. 11.

This embodiment differs from the above first embodiment in that a plurality of air holes 68 are bored on the front end portion 10a of the inner tube 10 for introducing the cooling air CA into the inner tube 10 through the holes 68. The diameter, number, location, position, etc. of the holes 68 may be appropriately determined according to need. By way of example, the diameter may be formed to be 8–10 mm.

According to the present invention, as is clear from the above embodiments, the gas extracted from the kiln exhaust gas can be rapidly cooled in the mixing and quick-cooling area formed at the front end portion of the probe.

According to the present invention, therefore, components such as alkali and chlorine contained in the extracted gas may be solidified with an improved efficiency to be concentrated into fine powder of the dust in the extracted gas.

Further, according to the present invention, since the cooling air is guided to flow into an inner area of the front end portion of the inner tube, blow-by of the cooling air into the rotary kiln can be prevented.

What is claimed is:

1. A method of cooling an exhaust gas in a kiln by-pass, said method comprising the steps of:
    providing a probe having a double-tubed structure in communication with a kiln exhaust gas flowing path;
    extracting a part of the kiln exhaust gas through an inner tube of the probe;
    supplying a cooling gas to a fluid flowing path formed between the inner tube and an outer tube of the probe; and
    guiding the cooling gas to flow into an inner area of a front end portion of the inner tube so as to form a mixing and quick-cooling area at a front end portion of the probe.

2. The method of cooling an exhaust gas in a kiln by-pass according to claim 1, wherein a flowing speed of the cooling gas is lower than a flowing speed of the extracted gas flowing in the inner tube of the probe.

3. The method of cooling an exhaust gas in a kiln by-pass according to claim 1, wherein a speed at which the cooling gas is discharged from the probe in the longitudinal direction thereof, is $1/3$–$2/3$ of the speed of the extracted gas flow in the inner tube of the probe.

4. The method of cooling an exhaust gas in a kiln by-pass according to claim 1, wherein the cooling gas flows circling.

5. An apparatus for cooling an exhaust gas in a kiln by-pass, comprising:
    a probe having a double-tubed structure communicating with a kiln exhaust gas flowing path, said probe including an inner tube for extracting a part of the kiln exhaust gas, an outer tube having a portion protruding from a front end portion of the inner tube, and a fluid flowing path formed between the inner tube and the outer tube for supplying a cooling gas therethrough; and
    a guide provided to enable the cooling gas to flow into an inner area of the front end portion of the inner tube so as to form a mixing and quick-cooling area at a front end portion of the probe.

6. The apparatus for cooling an exhaust gas in a kiln bypass according to claim 5, wherein the guide is a front end portion of the outer tube, the diameter of which gradually becomes smaller towards the front end thereof.

7. The apparatus for cooling an exhaust gas in a kiln by-pass according to claim 5, wherein the guide includes a front end portion of the outer tube, the diameter of which gradually becomes smaller towards the front end thereof, and a plurality of holes formed on a front end portion of the inner tube for introducing air to cool the kiln exhaust gas.

8. The apparatus for cooling an exhaust gas in a kiln by-pass according to claim 5, wherein the guide includes an oblique plate interposed between the front end portion of the inner tube and the front end portion of the outer tube, and a plurality of holes formed on the front end portion of the inner tube for introducing air to cool the kiln exhaust gas.

9. The apparatus for cooling an exhaust gas in a kiln by-pass according to claim 8, wherein the oblique plate is provided with a plurality of holes for introducing air to protect the front end of the probe.

10. The apparatus for cooling an exhaust gas in a kiln by-pass according to claim 5, wherein the front end portion of the outer tube is provided with a cooling means for protecting the front end of the probe.

11. The apparatus for cooling an exhaust gas in a kiln by-pass according to claim 10, wherein the cooling means for protecting the probe front end is a ring-like water cooling pipe.

12. The apparatus for cooling an exhaust gas in a kiln by-pass according to claim 5, wherein a value of (proble length PL)/(probe inner diameter 12L) is 2.0 or less.

* * * * *

UNITED STATES PATENT AND TRADEMARK OFFICE
CERTIFICATE OF CORRECTION

PATENT NO.   :   6,017,213
DATED        :   January 25, 2000
INVENTORS    :   Mitsuaki Murata et al.

It is certified that error appears in the above-identified patent and that said Letters Patent is hereby corrected as shown below:

Title page, item

[73] Assignee: "Taiheivo Cement Corporation" should be --Taiheiyo Cement Corporation--.

Column 4, line 43;
    "SA" should be --5A--.

Column 6, line 65;
    "bypass" should be --by-pass--.

Signed and Sealed this

Twentieth Day of March, 2001

Attest:

NICHOLAS P. GODICI

*Attesting Officer*   *Acting Director of the United States Patent and Trademark Office*